United States Patent
Tripp et al.

(10) Patent No.: US 11,630,919 B1
(45) Date of Patent: Apr. 18, 2023

(54) MANAGEMENT OF SENSITIVE DATA USING STATIC CODE ANALYSIS

(71) Applicant: Amazon Technologies, Inc., Seattle, WA (US)

(72) Inventors: Omer Tripp, San Jose, CA (US); Srinivasan Sengamedu Hanumantha Rao, Seattle, WA (US); Qiang Zhou, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 742 days.

(21) Appl. No.: 16/587,361

(22) Filed: Sep. 30, 2019

(51) Int. Cl.
*G06F 21/62* (2013.01)
*G06F 21/57* (2013.01)
*G06K 9/62* (2022.01)
*G06F 8/60* (2018.01)
*G06F 11/30* (2006.01)

(52) U.S. Cl.
CPC ............ *G06F 21/6281* (2013.01); *G06F 8/60* (2013.01); *G06F 11/302* (2013.01); *G06F 21/577* (2013.01); *G06K 9/6256* (2013.01); *G06F 2221/033* (2013.01)

(58) Field of Classification Search
CPC ...... G06F 21/6281; G06F 21/577; G06F 8/60; G06F 11/302; G06F 2221/033; G06K 9/6256
USPC ......................................................... 713/189
See application file for complete search history.

(56) References Cited

U.S. PATENT DOCUMENTS

| | | | | |
|---|---|---|---|---|
| 11,232,012 | B2 * | 1/2022 | Norrie | G06F 9/542 |
| 2020/0034666 | A1 * | 1/2020 | Yun | G06K 9/6262 |
| 2020/0097389 | A1 * | 3/2020 | Smith | G06F 11/3612 |
| 2020/0110600 | A1 * | 4/2020 | Weldemariam | G06K 9/627 |

OTHER PUBLICATIONS

Rubinov et al., 2016 IEEE/ACM 38th IEEE International Conference on Software Engineering, "Automated Partitioning of Android Applications for Trusted Execution Environments", pp. 923-934 (Year: 2016).*

Mani et al., 2009 IEEE International Conference on Web Services, "Efficient Testing of Service-Oriented Applications Using Semantic Service Stubs", pp. 197-204 (Year: 2009).*

* cited by examiner

*Primary Examiner* — Khalil Naghdali
*Assistant Examiner* — Mirza Israr Javed
(74) *Attorney, Agent, or Firm* — Nicholson De Vos Webster & Elliott LLP (57) ABSTRACT

Techniques for management of sensitive data using static code analysis are described. A method of management of sensitive data using static code analysis includes obtaining a representation at least a portion of code, statically analyzing at least the portion of code to generate one or more candidate vectors based at least on one or more patterns, sending the one or more candidate vectors to a sensitive data model, and receiving an inference response indicating, for each of the one or more candidate vectors, whether at least a portion of the candidate vector includes sensitive data and a corresponding confidence score.

20 Claims, 8 Drawing Sheets

MANAGEMENT OF SENSITIVE DATA USING STATIC CODE ANALYSIS

BACKGROUND

The field of machine learning has become widely acknowledged as a likely significant driver of the future of technology. Organizations everywhere now seek to use machine learning techniques to address a wide variety of problems, such as optimizing aspects of their products, processes, customer experience, etc. Protection of sensitive data, such as personally identifiable information (PII), payment card information (PCI), protected health information (PHI), etc. is an important concern of application developers, both from a regulatory standpoint and to maintain user trust. Identification of potential mishandling of sensitive data is key both to the development of new services and to the maintenance of existing services.

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for management of sensitive data using static code analysis. According to some embodiments, machine learning may be used to identify improper handling of sensitive data in code during static code analysis. A sensitive data management service can parse code (e.g., during code deployment, while the code is being written, during legacy code review, etc.) and identify code blocks that match code patterns that are known to be associated with sensitive data. Features may be extracted from these code blocks and a feature vector can be passed to a machine learning model that has been trained to determine whether a code block is likely to release (e.g., log, write, store, or otherwise manipulate sensitive data improperly) sensitive data. Based on the results returned from the model, feedback can be provided to the developer (e.g., the code can be instrumented with notes regarding potential mishandling of sensitive data). By identifying potential mishandling during static code analysis, sensitive data can be protected before the code is deployed.

Protection of sensitive data, including personally identifiable information (PII), payment card information (PCI), etc., is an important challenge of modern service providers. This challenge requires not only protecting sensitive data in new products but also to identify potential risks in older products that were developed before sensitive data protection was as important of a design feature. While policies may be used to define what data is considered sensitive, it is difficult to apply these policies during static code analysis, as the variables in the code have no actual values prior to execution. To address this, embodiments apply machine learning techniques to identify code blocks that may result in the unauthorized release of sensitive data.

Figure 1:
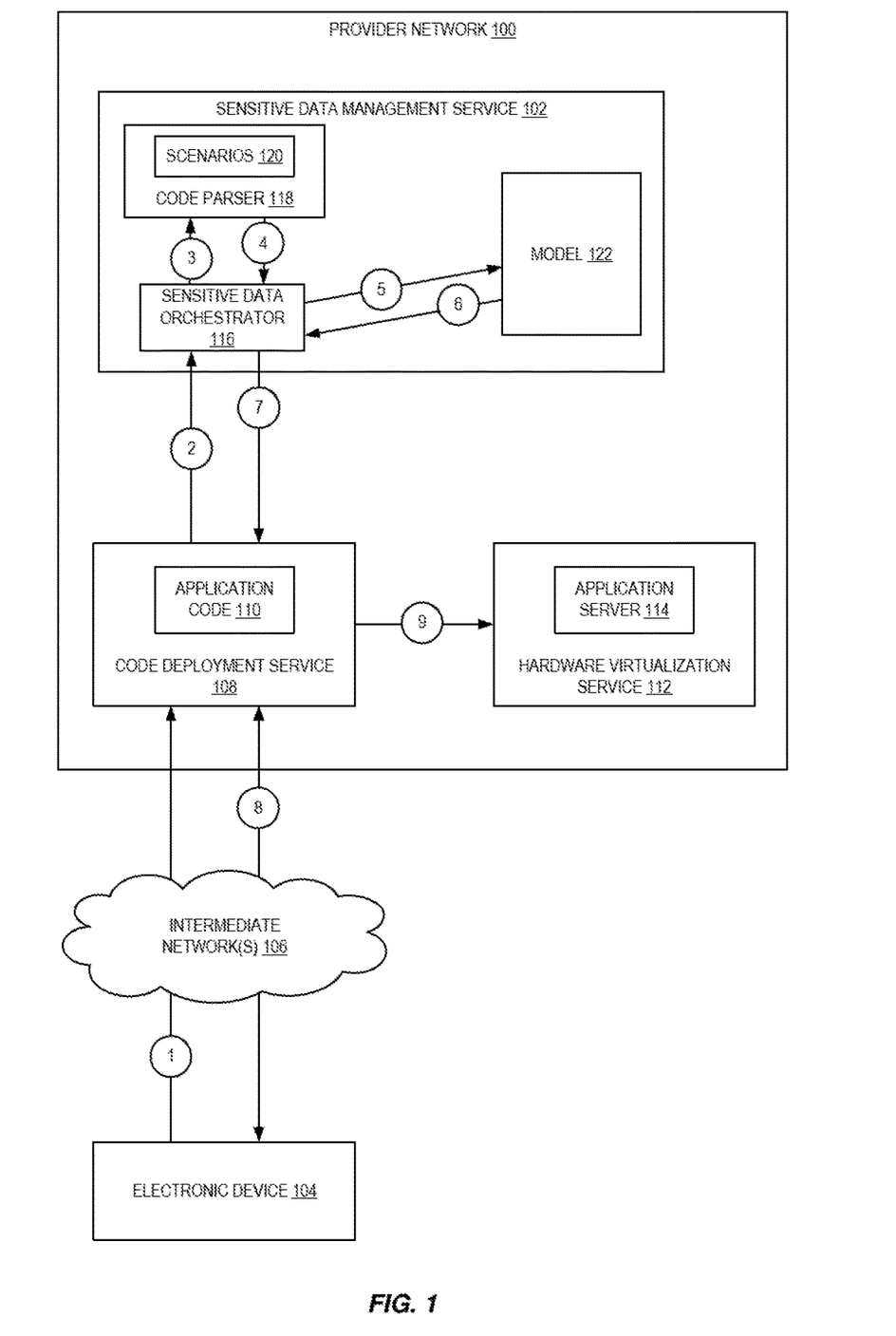
FIG. 1 is a diagram illustrating an environment for management of sensitive data using static code analysis according to some embodiments.

FIG. 1 is a diagram illustrating an environment for management of sensitive data using static code analysis according to some embodiments. A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand. Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

As shown in FIG. 1, a provider network 100 may include a sensitive data management service 102. Sensitive data management service 102 may analyze all or portions of code before it is deployed. For example, as shown in FIG. 1, the sensitive data management service 102 may serve requests received from a code deployment service 108. Alternative implementations may allow the sensitive data management service 102 to receive requests to analyze code at different stages of development or at different points in an application's lifecycle, as discussed further below. At numeral 1, a user, using electronic device 104, can provide application code 110 to code deployment service 108. In some embodiments, the user can upload the code to the code deployment service 108 or may provide a reference to the code stored in a storage service in provider network 100. In some embodiments, the application code may be developed by the user on electronic device 104 (or other electronic device(s), such as a user-owned data center, external to provider network 100). Alternatively, the user may provide a reference to a storage location in provider network 100, or accessible to provider network 100, from which code deployment service 108 can obtain the application code. Code deployment service 108 can implement a deployment pipeline in which various checks are performed on the code before it is deployed to production, such as on application server 114 provided by hardware virtualization service 112.

One of the checks performed by the code deployment service 108 may be a sensitive data check to be performed by sensitive data management service 102. At numeral 2, the code deployment service 108 can pass all or a portion(s) of application code 110 to sensitive data management service 102. A sensitive data orchestrator 116 can manage the processing of the application code by the sensitive data management service 102. At numeral 3, the sensitive data orchestrator 116 can pass the application code (or at least a portion of the application code) to a code parser 118. The code parser 118 can include scenarios 120 which define patterns in code that are associated with code elements that likely carry sensitive data.

Scenarios 120 may include various patterns that are associated with the handling of sensitive data in code. For example, one scenario may include comments in code may include a sensitive data token (e.g., PII, unique customer information (UCI), unique customer data (UCD), or other token associated with sensitive data) associated with an action (e.g., a read operation or a logging operation). Another scenario may include operations involving specific data types, such as SecureText, AccountData, or other data type known to carry sensitive data. Another scenario may include redaction and/or anonymization operations, such as the operands of an anonymization operation, or arguments of a redaction operation. Another scenario may include method names that identify that they include sensitive information, such as setPii( ), withPii( ), getPii( ), etc. Another scenario may include specific logging calls known to be associated with sensitive data, such as Log.pii( ) calls, or other logging calls with sensitive data tokens included in the signature.

Code parser 118 can use the scenarios 120 to mine the application code 110 (or at least a portion thereof) and identify code blocks that match any of the scenarios. In some embodiments, code parser 118 can generate a semantic representation of the application code or portions thereof. The semantic representation may be a representation of the control flow and data flow in the (possibly partial) program under analysis. In some embodiments, the semantic representation may be a graph representation. The code parser 118 can mine the semantic representation to identify a variable name, method name, data type, or other portion of the semantic representation that matches any of the scenarios. Then the semantic representation can be traversed from that matching portion based on the control and data flow in the representation. For example, the semantic representation enables statements in the code that precede the portion of the code that matches the scenario, such as a toString( ) statement that precedes a log.Pii( ) that logs a string generated by the toString( ) statement.

As used herein, code block may refer to individual code blocks from the codebase being mined and/or analyzed or to the parts of the semantic representation that have been traversed starting from the portion that matched the scenario. The code blocks may represent contiguous portions of code or noncontiguous portions of code that correspond to the parts of the semantic representation being traversed. These code blocks can then be represented by a feature vector. A feature vector may include tokens extracted from the code blocks of the semantic representation of the code that have been traversed. These tokens may be generated by tokenizing all or portions of the code block, and may include one or more of variable names, data types, method calls. In some embodiments, variable names may be divided into multiple tokens. For example, a variable named accountNumber, might be partitioned into two tokens: account and number. The feature vector may include each unique token identified in the corresponding code block. At numeral 4, the feature vectors for any matching code blocks can be returned to sensitive data orchestrator.

At numeral 5, the sensitive data orchestrator 116 can send an inference request to model 122 including the feature vectors. In some embodiments, a batch inference request that includes all of the feature vectors returned at numeral 4 may be sent. In some embodiments, a separate inference request may be sent for each feature vector. Model 122 can perform inference on each feature vector and return an indication as to whether the feature vector includes sensitive data and a confidence score associated with the indication, at numeral 6. For example, a first feature vector may return an inference response of positive, 95%, indicating that the first feature vector includes sensitive data with a confidence score of 95%. In some embodiments, if the feature vector includes a plurality of statements, the model can identify a subset of those statements as being the statements likely to handle sensitive data. For example, the tokens associated with each statement can be compared to tokens that are known to be associated with sensitive data. Such a comparison may include calculating a distance metric between the tokens from the feature vector and the tokens known to be associated with sensitive data, clustering analysis, or other techniques. Any statements found to be within a threshold distance of a known sensitive token may be highlighted as likely handling sensitive data in addition to the code associated with the feature vector being highlighted as likely handling sensitive data.

At numeral 7, sensitive data orchestrator can identify each code block associated with a positive inference result. For example, the code block may be identified by file name and/or line numbers, or other identification. In some embodiments, if the confidence score is above a threshold then an alert can be sent to the user. The alert may be generated by the sensitive data management service 102 and returned to the user through the code deployment service. In some embodiments, the code deployment service 102 may generate the alert when a code block is associated with a positive inference result with a confidence score above the threshold. The code deployment service 108 can present these code blocks to the user at numeral 8 who can then check these code blocks to determine whether sensitive data is being released and make appropriate changes to the application code to ensure sensitive data is handled properly. Once the application code has been updated, at numeral 9 the code deployment service can complete any other checks remaining in the code deployment pipeline and provide the application code to a production server to go live.

In some embodiments, at numeral 8 the action taken by the user can be logged. For example, if the user indicates that a code block does release sensitive data (e.g., through explicit feedback of selecting an icon in a user interface indicating that the inference was correct, or through implicit feedback by adding an anonymizing function, removing one or more fields from the operation, etc.), this feedback may be logged and returned to the sensitive data management service 102. The sensitive data management service can label the code block as sensitive and maintain the code block as a positive sample. These labeled code blocks can be used to further train the model, as discussed below, and/or to provide additional feedback to the user. For example, in addition to the inference result (e.g., positive/negative and confidence score), the sensitive data management service 102 can identify a nearest previously identified positive example. So, during inference, a code block may include a call such as log.address.getLine1( ). The confidence score may be below a threshold if such a call has not been previously identified as including sensitive data. However, similar calls, such as userAddress.getLine1( ) may have been previously labeled sensitive. The sensitive data management service 102 can calculate a distance between the candidate code block (e.g., log.address.getLine1( )) and the code block that is known to be sensitive, and return this information with the inference result. This provides the user with additional context to determine whether the candidate code block is handling sensitive data.

In some embodiments, code blocks determined to handle sensitive data can be highlighted and a comment can be added to the code including details about the handling of sensitive data (e.g., the confidence score, variable names that likely handle sensitive data, etc.). The user can accept or reject the highlighting/comment upon reviewing the code block. For example, if the user knows that the portion does not handle sensitive data, they may reject the message, clearing the highlighting from the user interface. In some embodiments, if the portion does handle sensitive data, they may accept the message and update the portion of the code to protect the sensitive data (e.g., add an anonymizer function to the sensitive data, remove the reference to the sensitive data, or other protective action).

In some embodiments, this feedback from the user (e.g., accepting or rejecting the highlight/comment) can be used to tune the confidence scores output by the model. In some embodiments, this tuning may lead to a model that is tailored to a particular user and their codebase (e.g., tailored to the types of data that the user (or a group of users) specifically considers sensitive). In some embodiments, a second machine learning model may be trained based on the user's behavior. This second model provides predictions as to whether this user is likely to identify data being handled by a code block as sensitive. In some embodiments, feedback from the user or users may be used to retrain the model 122 to improve the model's accuracy.

Figure 2:
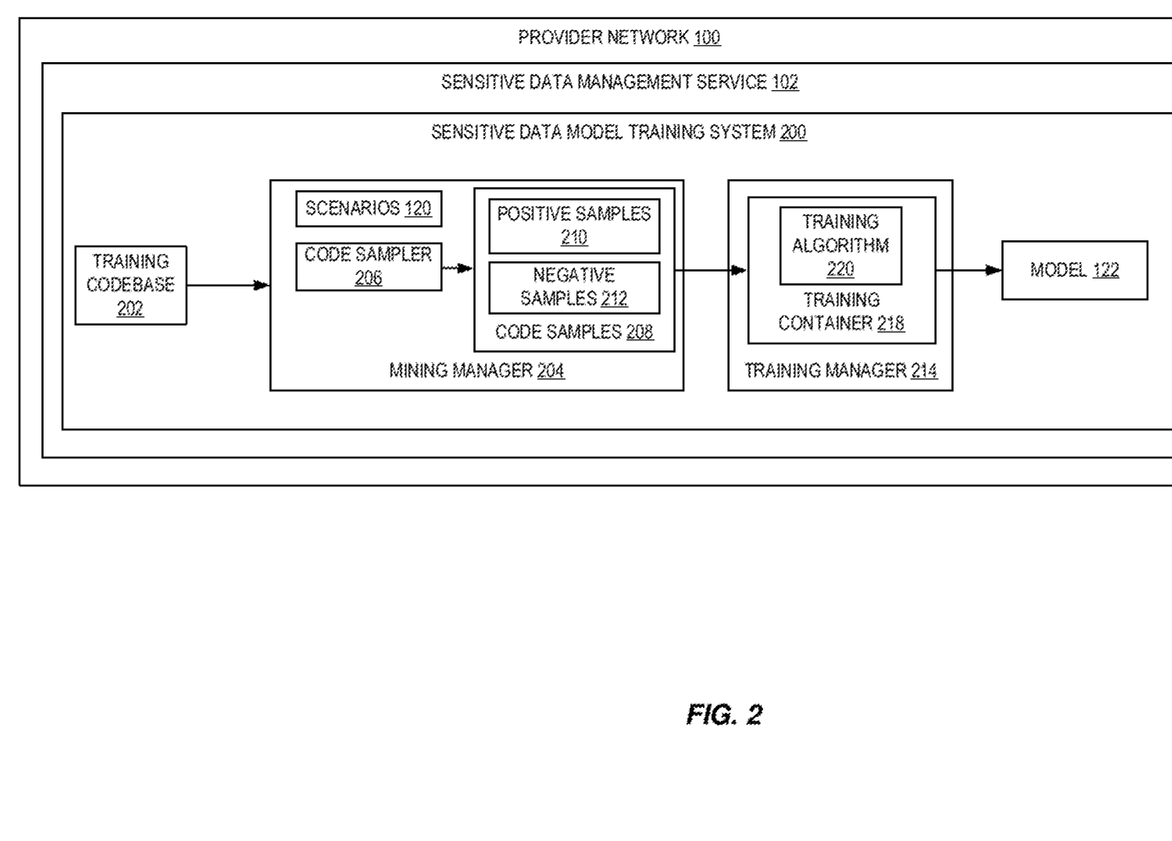
FIG. 2 is a diagram illustrating an environment for training a sensitive data model for use in static code analysis according to some embodiments.

FIG. 2 is a diagram illustrating an environment for training a sensitive data model for use in static code analysis according to some embodiments. As discussed, a sensitive data model can be used to predict whether a code block that matches a scenario is likely to handle sensitive data. In some embodiments, the sensitive data model may be a machine learning classification algorithm (e.g., a classifier) or other machine learning model which can be trained using a training codebase and then applied to arbitrary code blocks to determine whether the code elements in the code block are likely to carry sensitive data.

Sensitive data model training system 200 may be used to train such a model. Sensitive data model training system 200 may include a training codebase 202, or have access to a training codebase maintained within provider network 100. The training codebase 202 may include code for various services offered by provider network 100, opensource code, and/or other code accessible to the provider network. As discussed, scenarios 120 may be used to identify code blocks that may handle sensitive data. Scenarios 120 may include various patterns that are associated with the handling of sensitive data in code. For example, one scenario may include comments in code may include a sensitive data token (e.g., PII, unique customer information (UCI), unique customer data (UCD), or other token associated with sensitive data) associated with an action (e.g., a read operation or a logging operation). Another scenario may include operations involving specific data types, such as SecureText, AccountData, or other data type known to carry sensitive data. Another scenario may include redaction and/or anonymization operations, such as the operands of an anonymization operation, or arguments of a redaction operation. Another scenario may include method names that identify that they include sensitive information, such as setPii( ), withPii( ), getPii( ), etc. Another scenario may include specific logging calls known to be associated with sensitive data, such as Log.pii( ) calls, or other logging calls with sensitive data tokens included in the signature.

Mining manager 204 may include a code sampler 206 which can mine the training codebase using the scenarios 120 to generate a plurality of code samples 208. The code sampler can identify blocks of the training codebase that match any of the scenarios. For example, the training codebase may include the following code snippet:

```
public void playTitle(String a sin) {
    Log.pii("ListenNowActivity.playTitle("+format(a sin)+")
        ");
    try {
        String aaxFilePath=this.libraryManager.getProfileData
            (a sin).getAudioFileName( );
        . . .
    } catch (Exception e) {
        . . .
    }
}
```

Here, the Log.pii( ) expression matches a scenario as described above. As, such the code sampler 206 can record a positive sample 210. Each positive sample can include a vector of features extracted from the matching code block. In the above example, the features may include the tokenized variable name (e.g., "a sin"), the data type (e.g., String), and any use of the variable outside of the matching scenario. In the above example, usage of the variable a sin within the Log.pii( ) statement would not be included in the feature vector, but usage outside the Log.pii statement (e.g., libraryManager.getProfileData( )). Similar positive samples 210 may be collected for every code block within the training codebase that is determine by the code sampler to match one of the scenarios 120. Code sampler 206 may also collect negative samples 212. The negative samples may include benign portions of the training codebase that do not handle sensitive data. In some embodiments, code sampler 206 can randomly sample the training codebase for negative samples, as there are generally very few instances of sensitive data being handled in a given codebase. Feature vectors may likewise be generated for each code block that is sampled for negative samples 212. In some embodiments, heuristics may be used to determine which portions of the training codebase are to be mined for negative samples. For example, methods having names that include tokens that are known to be associated with sensitive data may not be selected to be mined. Additionally, or alternatively, portions of the training codebase which have already been mined for positive samples, and which were not found to include positive samples, may be selected to be mined for negative samples. In some embodiments, bag-of-words modelling may be used to construct these vectors. The size of the vector can be equal (or approximately equal) to the number of unique tokens in the dataset (e.g., code block, training codebase, arbitrary code being analyzed, etc.), and each index of this vector stores the number of appearances of the corresponding token in the sample.

In some embodiments, when a code block is identified as matching one of the scenarios, the code can be reverse traversed to determine where a variable of interest originates and how it is used outside of the matching statement. For example, when a Log.pii statement is identified, the variables being logged can be reverse traversed back from the variable, to the data structure from which the variable was extracted (e.g., if a string is being logged, the toString( ) statement that was used to extract that string can be identified and the data structure from which it was extracted can be identified. Similar traversals may be performed on other portions of the code block, collecting additional API or other method calls in the course of the traversal. These may all be tokenized and added to the feature vector for this code block.

The code samples 208, including the positive sample feature vectors and the negative sample feature vectors, can be sent to a training manager 214 which may include a training container 218. Generally, the training container 218 is a logical unit created within a virtual machine instance using the resources available on that instance and can be utilized to isolate execution of a task from other processes (for example, task executions) occurring in the instance. In some embodiments, the training container 218 is formed from one or more container images and a top container layer. Each container image may further include one or more image layers, where each image layer represents an executable instruction. As described above, some or all of the executable instructions together represent an algorithm that defines a machine learning model. Changes made to the training container 218 (for example, creation of new files, modification of existing files, deletion of files, etc.) are stored in the top container layer. If a training container 218 is deleted, the top container layer is also deleted. However, the container image(s) that form a portion of the deleted training container 218 can remain unchanged. The training container 218 can be implemented, for example, as a Linux container (LXC), Docker container, and the like.

The code samples 208 can be used to perform the machine learning model training. The training container can execute one or more training algorithms 220 implemented by the training container 218. For example, the training algorithm 220 includes some or all of the executable instructions that form the container image of the training container 218 initialized therein. Thus, the training manager 214 executes some or all of the executable instructions that form the container image of the training container 218 initialized therein to train a machine learning model. The training manager 214 executes some or all of the executable instructions according to the hyperparameter values included in the training request. As an illustrative example, the training manager 214 trains a machine learning model 122 by identifying values for certain parameters (for example, coefficients, weights, centroids, etc.). The identified values depend on hyperparameters that define how the training is performed. Thus, the training manager 214 can execute the executable instructions to initiate a machine learning model training process, where the training process is run using the hyperparameter values included in the training request. Execution of the executable instructions can include the training manager 214 applying the training data retrieved by the sensitive data model training system 200 as input parameters to some or all of the instructions being executed.

In some embodiments, the training manager 214 can train a binary classifier that evaluates whether an arbitrary input block of code (or feature vector representation thereof) is likely to handle sensitive data. In addition to classifiers, other machine learning models may also be trained using the code samples 208 mined from the training codebase 202. The trained machine learning model 122 can then be applied to new code on which it may perform inference.

In some embodiments, the code samples 208 obtained from mining the training codebase 202 can be preprocessed to improve the accuracy of the model 122. A clustering analysis can be performed on the code samples to identify a plurality of clusters. This may result in clusters of samples with a very high confidence of handling sensitive data, clusters with medium confidence, and clusters with low confidence. The clusters with low confidence can be excluded from further analysis. Clusters with medium confidence can be iteratively relabeled as positive or negative. In some embodiments, a semi-supervised learning process, such as tri-training, may be used for this pre-processing step. Preprocessing in this manner gives more attention to the potentially borderline clusters. By further analyzing these borderline samples, and marking those that do not include sensitive data as negative, the confidence of the positive samples is improved.

Figure 3:
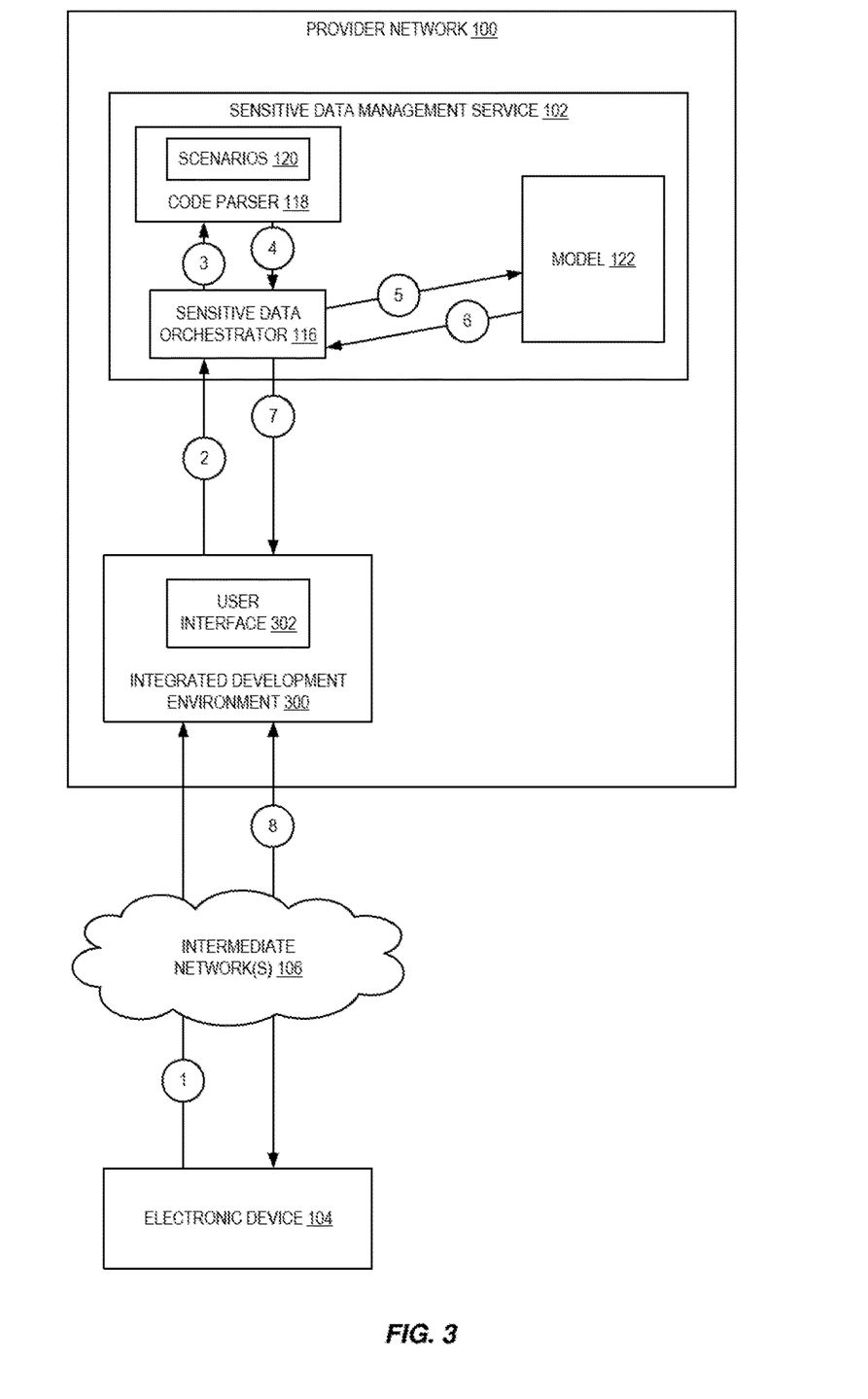
FIG. 3 is a diagram illustrating an environment for management of sensitive data using static code analysis in an integrated development environment (IDE) according to some embodiments.

FIG. 3 is a diagram illustrating an environment for management of sensitive data using static code analysis in an integrated development environment (IDE) according to some embodiments. As shown in FIG. 3, embodiments can be implemented using an IDE, to provide real-time feedback to developers as they write code. An IDE 300 may be provided by provider network 100. The IDE may provide a user interface 302, such as a web interface, console interface, or other interface into which the user may write code. As shown at numeral 1, the user can access the IDE in provider network 100 via their electronic device 104 over one or more networks 106. As the user writes code in the IDE, blocks of code can be sent, at numeral 2, to sensitive data management service 102. In some embodiments, the blocks of code may be sent directly to the sensitive data management service or the blocks of code may be sent to a storage location in a storage service accessible to the sensitive data management service. The sensitive data orchestrator 116 can send the code blocks to the code parser 118 at numeral 3. As discussed above, the code parser can user scenarios 120 to identify portions of the code which may handle sensitive data. The code parser can generate a feature vector for these matching portions and return the feature vectors to sensitive data orchestrator 116, at numeral 4.

The sensitive data orchestrator 116, at numeral 5, can send the feature vectors to model 122 and receive an inference response indicating whether the feature vector corresponds to a portion of code that likely handles sensitive data, at numeral 6. At numeral 7, the sensitive data orchestrator can package the inference response such that the user interface 302 can provide feedback to the user within the IDE user interface. For example, the response at numeral 7 may include line numbers associated with the portion of the code that was analyzed, and may instruct the user interface to highlight the portion of code in those line numbers and add a message, such as "this portion of code likely handles sensitive data." In some embodiments, at numeral 8, the user can accept or reject the message indicating that the portion likely handles sensitive data. For example, if the user knows that the portion does not handle sensitive data, they may reject the message, clearing the highlighting from the user interface. In some embodiments, if the portion does handle sensitive data, they may accept the message and update the portion of the code to protect the sensitive data (e.g., add an anonymizer function to the sensitive data, remove the reference to the sensitive data, or other protective action).

Figure 4:
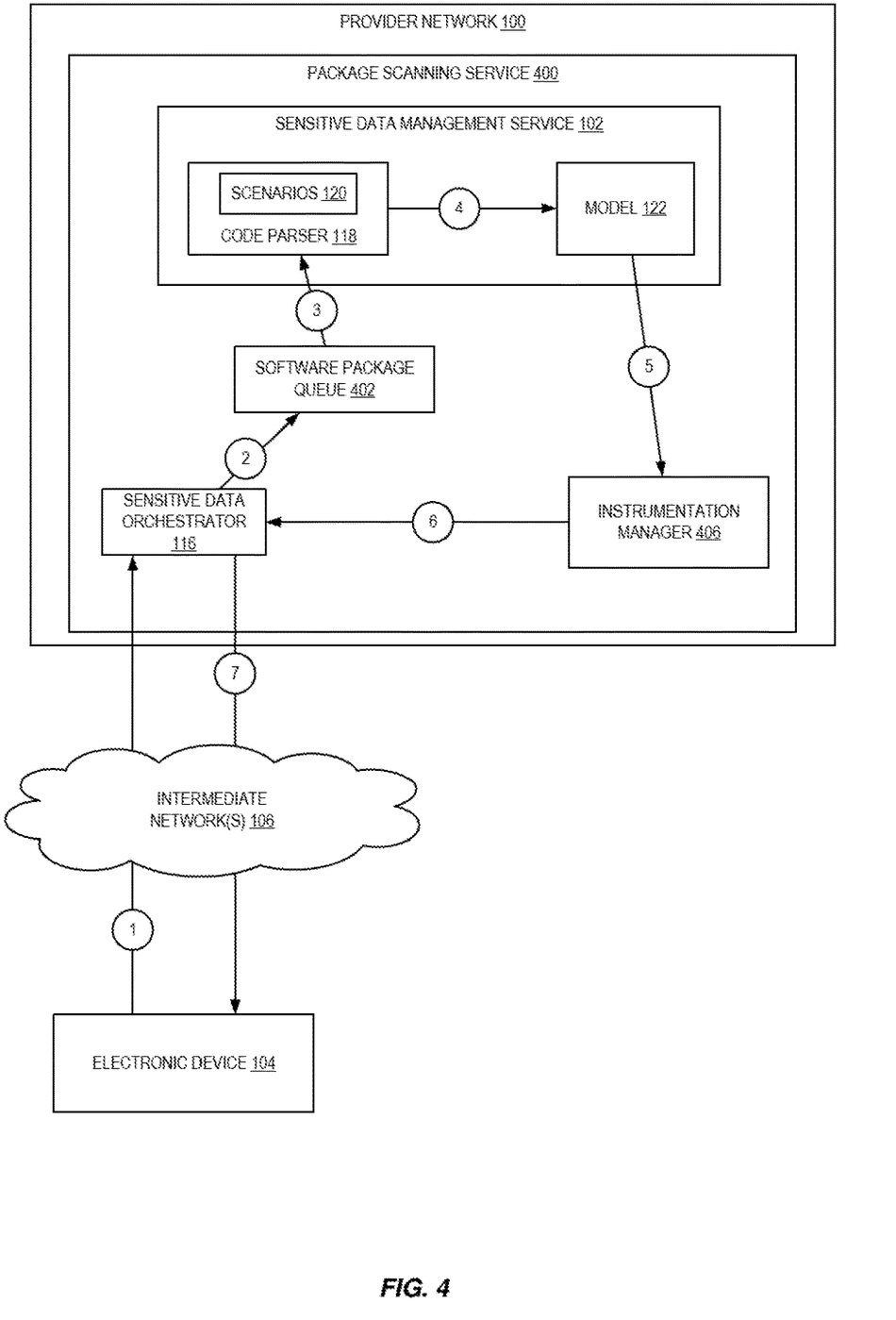
FIG. 4 is a diagram illustrating an environment for management of sensitive data using static code analysis in a package scanning service according to some embodiments.

FIG. 4 is a diagram illustrating an environment for management of sensitive data using static code analysis in a package scanning service according to some embodiments. As shown in FIG. 4, embodiments may be used to review software packages for any potential mishandling of sensitive data. Legacy software applications may have been written before sensitive data handling was prioritized. These software applications may remain in use, and put sensitive data at risk. As such, embodiments enable software packages to be submitted for review through a package scanning service 400 which implements the sensitive data management service 102. At numeral 1, a user may provide one or more software packages to sensitive data orchestrator 116. The user may provide the software packages by uploading them to the sensitive data orchestrator, or by providing a reference (e.g., URL, URI, access credentials, etc.) to a storage location where the software package or packages can be accessed. The sensitive data orchestrator can add the packages to a software package queue 402 at numeral 2. In some embodiments, the software package queue may be implemented as a storage location in a storage service provided by provider network 100.

In some embodiments, code parser 118 can poll the software package queue 402 at regular intervals to determine whether a new software package has been added to be scanned. When a software package is identified, at numeral 3, the code parser can obtain the software package and begin mining the software package using scenarios 120 to identify candidate code blocks that may handle sensitive data, as discussed above. At numeral 4, feature vectors representing this candidate code blocks can be sent to model 122. As discussed, model 122 can provide an indication as to whether the candidate code block handles sensitive data and a confidence score for the prediction. This can be sent to instrumentation manager 406 at numeral 5. Instrumentation manager 406 is responsible for instrumenting the code package being reviewed. In some embodiments, the instrumentation manager can instrument the code package as inference results are received from the model. In some embodiments, the instrumentation manager can highlight code blocks with a confidence score greater than a threshold. In some embodiments, the instrumentation manager can highlight different confidence intervals in different colors (e.g., confidence scores of 90-100 get a red highlight, confidence scores of 70-90 get an orange highlight, etc.). The instrumentation manager may also add comments to the code, such as identifying variable names that likely handle sensitive data. Once the code is instrumented, at numeral 6, it can be returned to sensitive data orchestrator 116. The sensitive data orchestrator can return the instrumented software package to the user at numeral 7.

Figure 5:
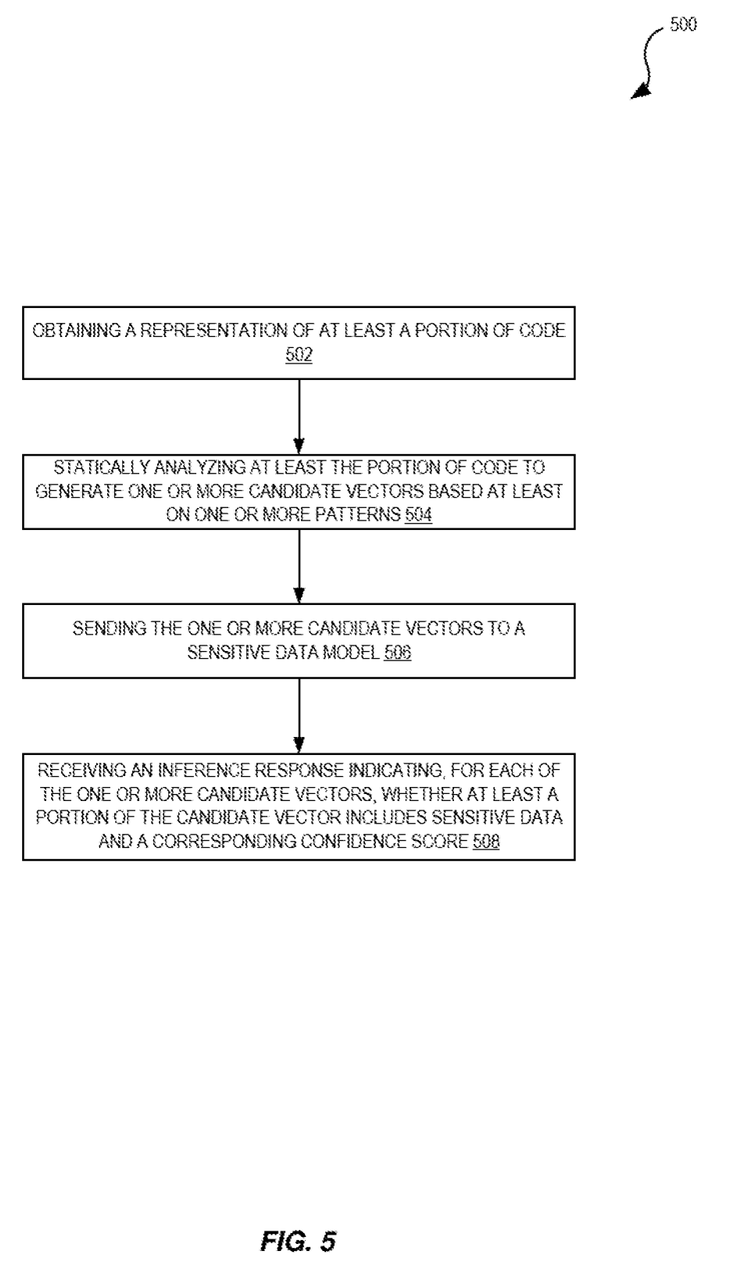
FIG. 5 is a flow diagram illustrating operations of a method for management of sensitive data using static code analysis according to some embodiments.

FIG. 5 is a flow diagram illustrating operations 500 of a method for management of sensitive data using static code analysis according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by sensitive data management service 102 of the other figures.

The operations 500 include, at block 502, obtaining a representation of at least a portion of code. In some embodiments, the portion of code may be uploaded from an electronic device. In some embodiments, the representation of at least the portion of the code is a semantic representation that indicates a control flow and a data flow of at least the portion of the code. In some embodiments, a reference may be provided to a storage location associated with the portion of code (e.g., a storage location in a storage service of a provider network). In some embodiments, at least the portion of the code is from a software package obtained by a sensitive data management service implemented in a package scanning service, wherein the inference response is used to instrument at least the portion of the code. In some embodiments, at least the portion of the code is received from an integrated development environment (IDE) in real-time as code is written in the IDE, and wherein the inference response is used to provide feedback in real-time through the IDE. In some embodiments, at least the portion of the code is received from a code deployment pipeline in a provider network prior to at least the portion of the code being deployed to a production server in the provider network.

The operations 500 further include, at block 504, statically analyzing at least the portion of code to generate one or more candidate vectors based at least on one or more patterns. In some embodiments, the one or more patterns include one or more of sensitive variable names, sensitive data types, sensitive method names, or data operations correlated with sensitive data. The operations 500 further include, at block 506, sending the one or more candidate vectors to a sensitive data model. In some embodiments, each candidate vector includes a plurality of tokens from a portion of the representation of at least the portion of the code that matches at least one pattern. In some embodiments, the plurality of tokens correspond to one or more of variable names, data types, or method names.

The operations 500 further include, at block 508, receiving an inference response indicating, for each of the one or more candidate vectors, whether at least a portion of the candidate vector includes sensitive data and a corresponding confidence score. In some embodiments, the operations 500 may further include obtaining a training codebase, mining the training codebase based at least on the one or more patterns to generate a first plurality of training vectors, labeling the first plurality of training vectors as positive samples, sampling a portion of the training codebase to generate a second plurality of training vectors, wherein the portion of the training codebase includes code that was unsuccessfully mined for the first plurality of training vectors, and labeling the second plurality of training vectors as negative samples. In some embodiments, the operations may further include training the sensitive data model based at least on the positive samples and the negative samples.

In some embodiments, receiving an inference response indicating, for each of the one or more candidate vectors, whether at least a portion of the candidate vector includes sensitive data and a corresponding confidence score, may further include comparing at least one token in at least the portion of the candidate vector to known sensitive tokens, and identifying a field in at least the portion of the code corresponding to the at least one token as including sensitive data.

In some embodiments, the operations may include obtaining, by a code deployment service in a provider network, application code to be deployed to at least one application server in the provider network, providing, by the code deployment service to a sensitive data management service, the application code, statically analyzing a semantic representation of the application code by the sensitive data management service using a plurality of scenarios, each scenario defining a code pattern associated with handling of sensitive data, to identify a plurality of code blocks of the application code that match at least one of the plurality of scenarios, wherein the semantic representation indicates control flow and data flow in the application code, generating a plurality of candidate vectors corresponding to the plurality of code blocks, sending the plurality of candidate vectors to a sensitive data model, and receiving an inference response indicating, for each of the plurality of candidate vectors, whether the candidate vector handles sensitive data and a corresponding confidence score.

In some embodiments, the one or more scenarios include one or more of sensitive data tokens, sensitive data types, or sensitive data operations. In some embodiments, generating a plurality of candidate vectors corresponding to the plurality of code blocks, may further comprise for each code block: tokenizing the code block, including variable names, method names, and data types, into a plurality of tokens, and generating a corresponding vector including unique tokens from the plurality of tokens, wherein a size of the corresponding vector is a number of unique tokens in the code block, and each index of the corresponding vector stores a number of appearances of a corresponding token in the code block.

In some embodiments, statically analyzing the application code by the sensitive data management service using a plurality of scenarios, each scenario defining a code pattern associated with handling of sensitive data, to identify a plurality of code blocks of the application code that match at least one of the plurality of scenarios, may further include mining from the semantic representation based at least on the plurality of scenarios to identify parts of the semantic representation that match at least one of the plurality of scenarios, and identifying each code block by traversing the semantic representation from one of the parts of the semantic representation that matches at least one of the plurality of scenarios.

Figure 6:
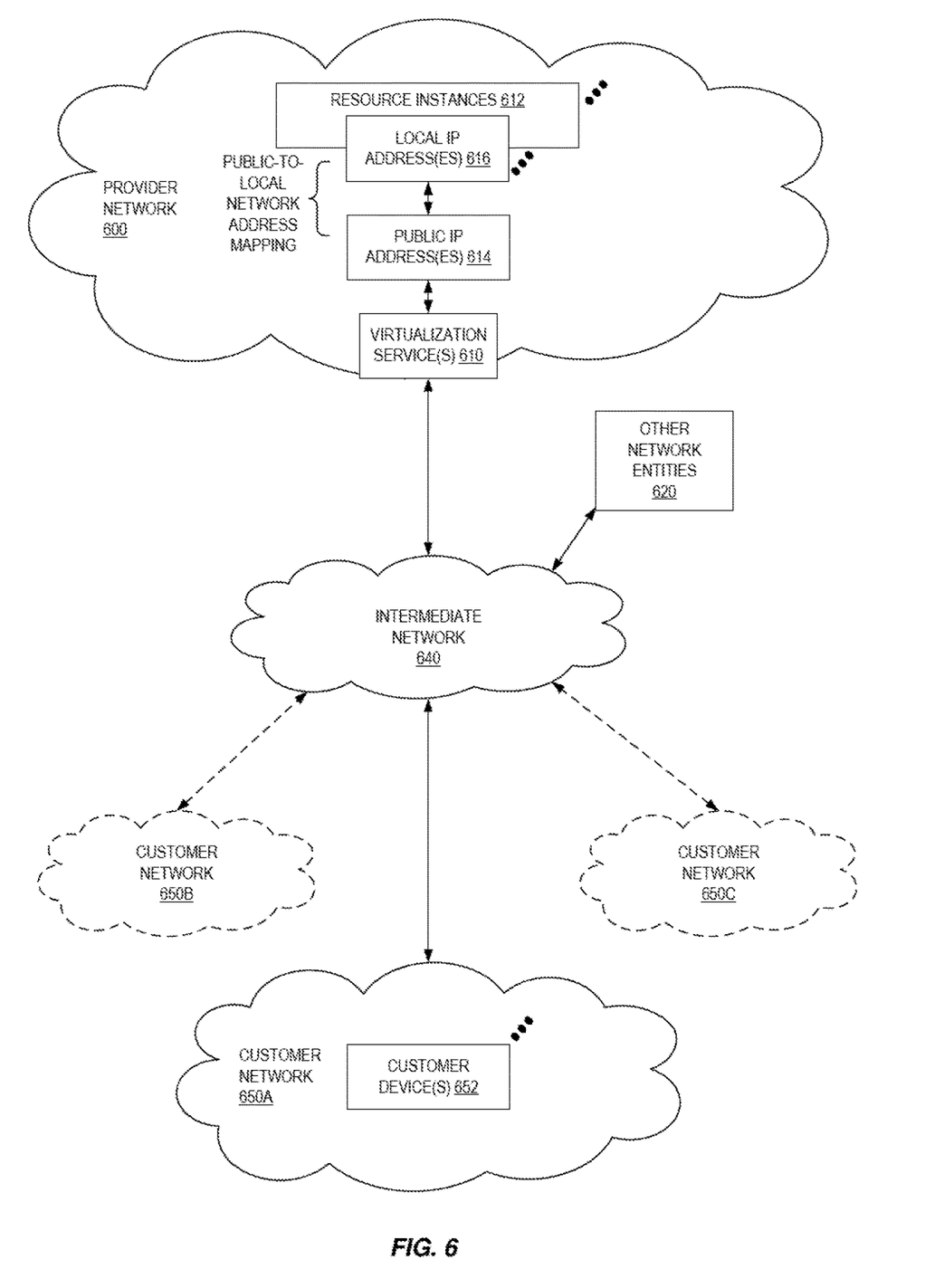
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
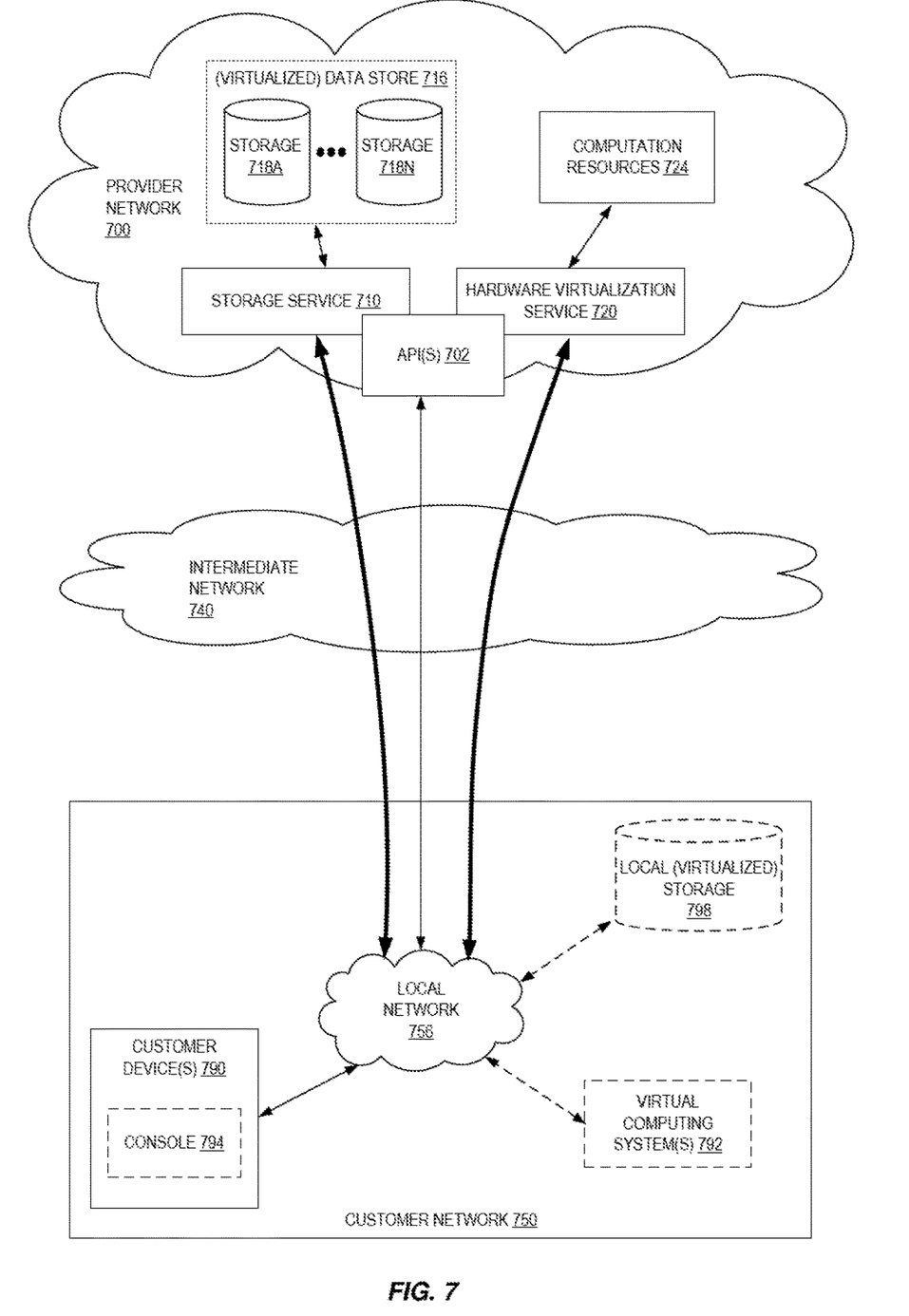
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative Systems

Figure 8:
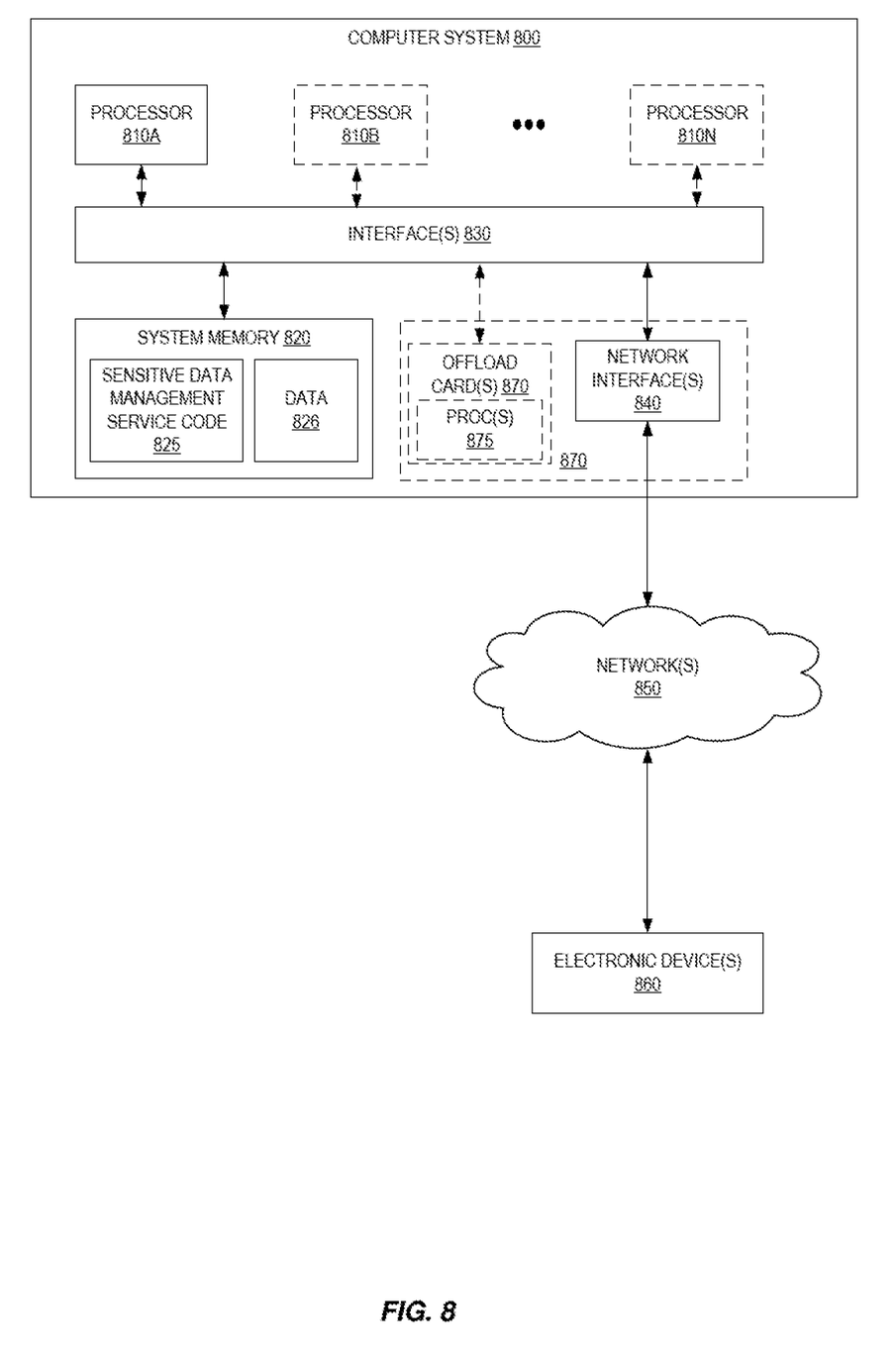
FIG. 8 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as sensitive data management service code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
obtaining, by a code deployment service in a provider network, application code to be deployed to at least one application server in the provider network;
providing, by the code deployment service to a sensitive data management service, the application code;
statically analyzing, by the sensitive data management service, a semantic representation of the application code using a plurality of scenarios, each scenario defining a code pattern associated with handling of sensitive data, wherein the semantic representation of the application code indicates control flow and data flow in the application code;
identifying, by the sensitive data management service, a plurality of matching code blocks of the application code that match at least one of the code patterns;
generating a plurality of candidate vectors corresponding to the plurality of code blocks;
sending the plurality of candidate vectors to a sensitive data model; and
receiving an inference response indicating, for each of the plurality of candidate vectors, whether the candidate vector handles sensitive data and a corresponding confidence score.

2. The computer-implemented method of claim 1, wherein the one or more scenarios include one or more of sensitive data tokens, sensitive data types, or sensitive data operations.

3. The computer-implemented method of claim 1, wherein statically analyzing, by the sensitive data management service, a semantic representation of the application code using a plurality of scenarios, each scenario defining a code pattern associated with handling of sensitive data, further comprises:
mining the semantic representation of the application code based at least on the plurality of scenarios to identify parts of the semantic representation of the application code that match at least one of the code patterns; and
identifying each matching code block by traversing the semantic representation of the application code from one of the parts of the semantic representation of the application code that matches at least one of the code patterns.

4. A computer-implemented method comprising:
obtaining a representation of at least a portion of code;
statically analyzing the at least the portion of code using a plurality of scenarios, each scenario defining a code pattern associated with handling of sensitive data;
identifying at least one matching code block of the at least the portion of code that matches at least one of the code patterns;
generating one or more candidate vectors based at least on the at least one matching code block;
sending the one or more candidate vectors to a sensitive data model; and
receiving an inference response indicating, for each of the one or more candidate vectors, whether at least a portion of the candidate vector includes sensitive data and a corresponding confidence score.

5. The computer-implemented method of claim 4, wherein the code patterns include one or more of sensitive variable names, sensitive data types, sensitive method names, or data operations correlated with sensitive data.

6. The computer-implemented method of claim 4, further comprising:
obtaining a training codebase;
mining the training codebase based at least on the code patterns to generate a first plurality of training vectors;
labeling the first plurality of training vectors as positive samples;
sampling a portion of the training codebase to generate a second plurality of training vectors, wherein the portion of the training codebase includes code that was unsuccessfully mined for the first plurality of training vectors; and
labeling the second plurality of training vectors as negative samples.

7. The computer-implemented method of claim 6, further comprising training the sensitive data model based at least on the positive samples and the negative samples.

8. The computer-implemented method of claim 4, wherein each vector includes a plurality of tokens from a portion of the representation of at least the portion of the code that matches the at least one of the code patterns.

9. The computer-implemented method of claim 8, wherein the plurality of tokens correspond to one or more of variable names, data types, or method names.

10. The computer-implemented method of claim 4, wherein at least the portion of the code is from a software package obtained by a sensitive data management service implemented in a package scanning service, wherein the inference response is used to instrument at least the portion of the code.

11. The computer-implemented method of claim 4, wherein at least the portion of the code is received from an integrated development environment (IDE) in real-time as code is written in the IDE, and wherein the inference response is used to provide feedback in real-time through the IDE.

12. The computer-implemented method of claim 4, wherein at least the portion of the code is received from a code deployment pipeline in a provider network prior to at least the portion of the code being deployed to a production server in the provider network.

13. The computer-implemented method of claim 4, wherein receiving an inference response indicating, for each of the one or more candidate vectors, whether at least a portion of the candidate vector includes sensitive data and a corresponding confidence score, further comprises:
comparing at least one token in at least the portion of the candidate vector to known sensitive tokens; and
identifying a field in at least the portion of the code corresponding to the at least one token as including sensitive data.

14. The computer-implemented method of claim 4, wherein the representation of at least the portion of the code is a semantic representation that indicates a control flow and a data flow of at least the portion of the code.

15. A system comprising:
a storage service implemented by a first one or more electronic devices; and
a sensitive data management service implemented by a second one or more electronic devices, the sensitive data management service including instructions that upon execution cause the sensitive data management service to:
- obtain a representation of at least a portion of code from the storage service;
- statically analyze the at least the portion of code using a plurality of scenarios, each scenario defining a code pattern associated with handling of sensitive data;
- identify at least one matching code block of the at least the portion of code that matches at least one of the code patterns;
- generate one or more candidate vectors based at least on the at least one matching code block;
- send the one or more candidate vectors to a sensitive data model; and
- receive an inference response indicating, for each of the one or more candidate vectors, whether at least a portion of the candidate vector includes sensitive data and a corresponding confidence score.

16. The system of claim 15, wherein the code patterns include one or more of sensitive variable names, sensitive data types, sensitive method names, or data operations correlated with sensitive data.

17. The system of claim 15, wherein the instructions, when executed, further cause the sensitive data management service to:
- obtain a training codebase;
- mine the training codebase based at least on the code patterns to generate a first plurality of training vectors;
- label the first plurality of training vectors as positive samples;
- sample a portion of the training codebase to generate a second plurality of training vectors, wherein the portion of the training codebase includes code that was unsuccessfully mined for the first plurality of training vectors; and
- label the second plurality of training vectors as negative samples.

18. The system of claim 17, wherein the instructions, when executed, further cause the sensitive data management service to train the sensitive data model based at least on the positive samples and the negative samples.

19. The system of claim 15, wherein each vector includes a plurality of tokens from a corresponding portion of the representation of at least the portion of the code that matches the at least one of the code patterns.

20. The system of claim 19, wherein the plurality of tokens correspond to one or more of variable names, data types, or method names.

* * * * *